United States Patent [19]

Herolf

[11] Patent Number: 4,838,328
[45] Date of Patent: Jun. 13, 1989

[54] METHOD FOR MECHANIZED THINNING OF A FOREST, AND A HARVESTER AND FORWARDER FOR CARRYING OUT THE METHOD

[75] Inventor: Olof Herolf, Sundsvall, Sweden

[73] Assignee: OSA AB, Alfta, Sweden

[21] Appl. No.: 101,295

[22] PCT Filed: Jan. 5, 1987

[86] PCT No.: PCT/SE87/00002
§ 371 Date: Aug. 25, 1987
§ 102(e) Date: Aug. 25, 1987

[87] PCT Pub. No.: WO87/04045
PCT Pub. Date: Jul. 16, 1987

[30] Foreign Application Priority Data
Jan. 10, 1986 [SE] Sweden ................. 8600120

[51] Int. Cl.[4] ........................................ A01G 23/08
[52] U.S. Cl. ........................... 144/336; 83/928; 30/379.5; 144/2 Z; 144/3 D; 144/343; 280/442
[58] Field of Search ............... 414/509, 546, 486; 86/DIG. 2; 30/379.5; 83/928; 144/2 Z, 3 D, 34 R, 34 B, 33 S, 336; 180/242; 280/426, 442

[56] References Cited

U.S. PATENT DOCUMENTS 3,340,912 9/1967 Williams et al. .................. 144/2 Z Primary Examiner—W. Donald Bray
Attorney, Agent, or Firm—McFadden, Fincham, Marcus & Allen

[57] ABSTRACT

The invention relates to a method for thinning a forest by means of a wheeled harvester and a wheeled forwarder comprising a driver's cab and a load carrier located behind the cab. The harvester (3) is caused to advance in existing forest stands (1) in routes optimally selectable with regard to the characteristics of the stand, between main haul roads or strip roads close to each other, and is parked on suitable places along the routes for felling trees on each parking place. The trees are limbed and placed underneath the harvester between the wheels thereof, and the forwarder (4) is caused to follow the harvester in the same route as this and take care of the tree stems placed underneath the harvester and left behind it. This is achieved in that the felled trees lying in front of the forwarder are lifted by it and moved over and rearwards past the cab of the forwarder to the load carrier situated behind the cab. As the forwarder is advanced along the route, it collects the tree stems for landing them at a suitable main haul road.

4 Claims, 5 Drawing Sheets

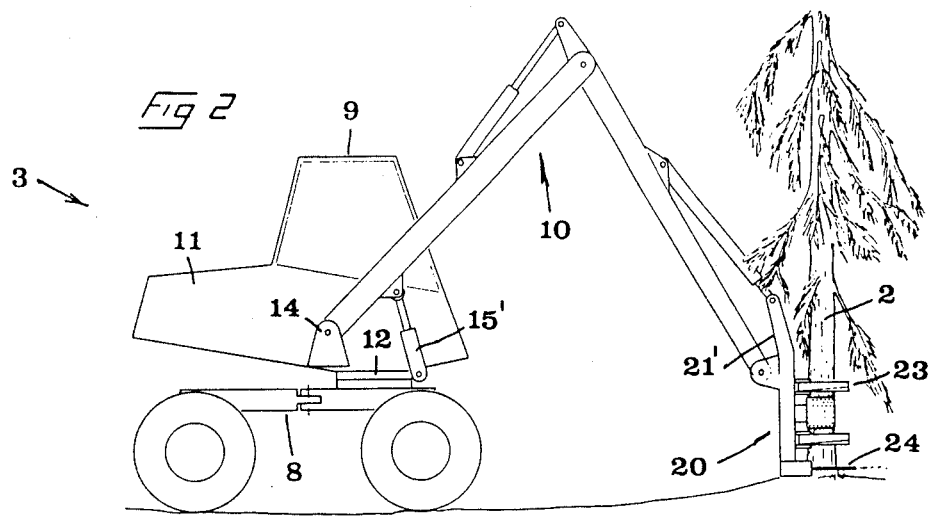
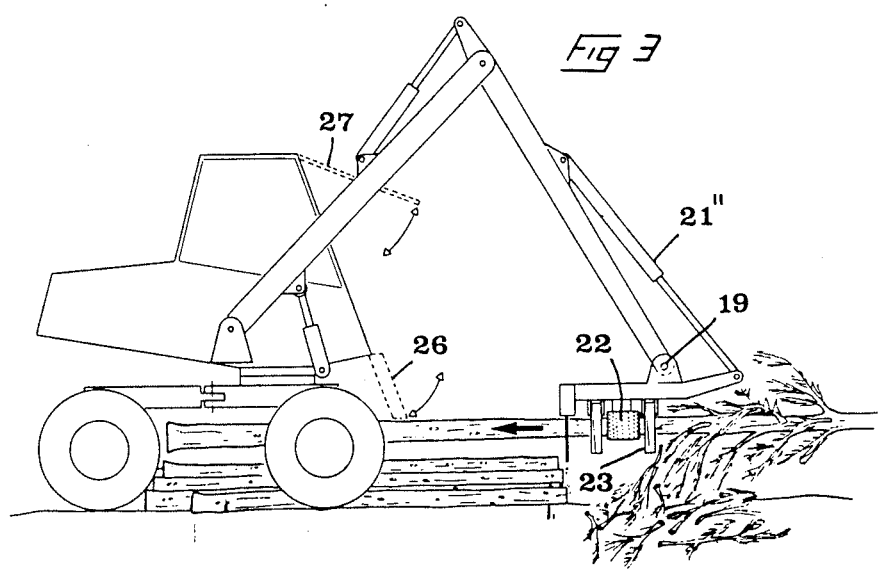

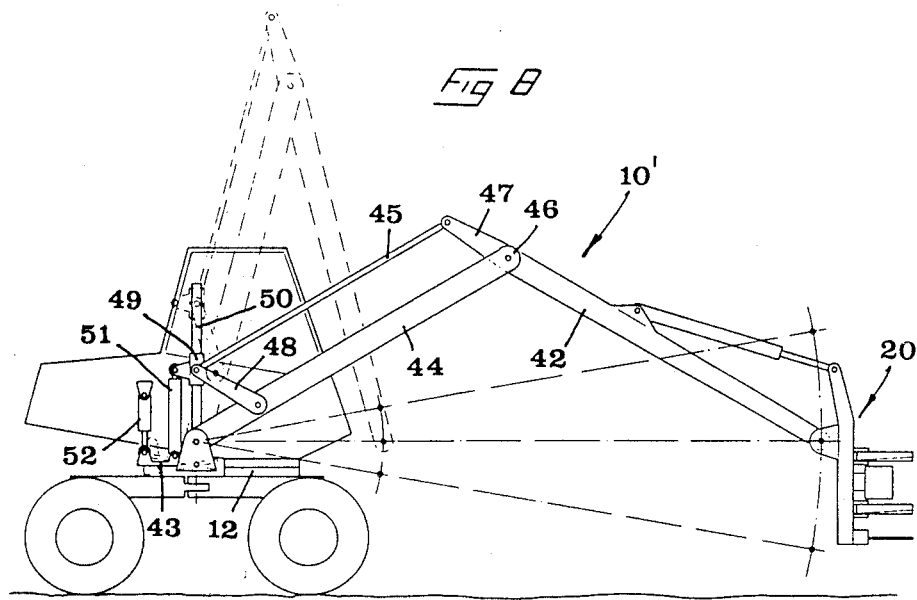
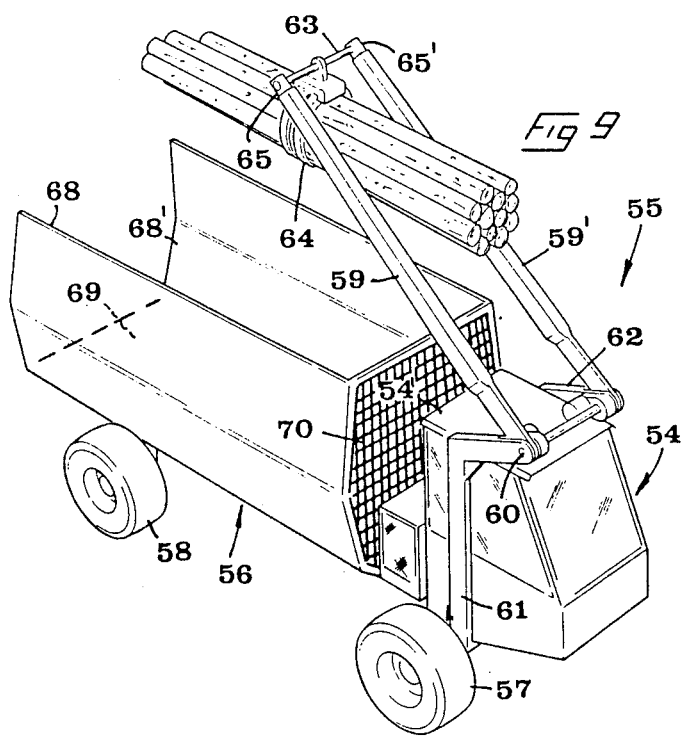

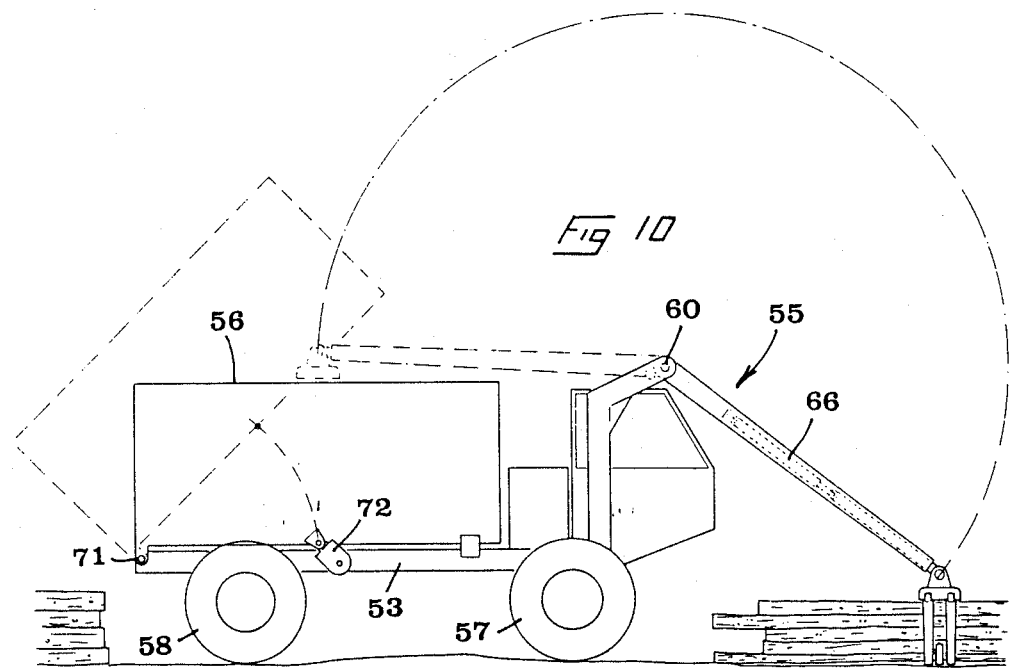
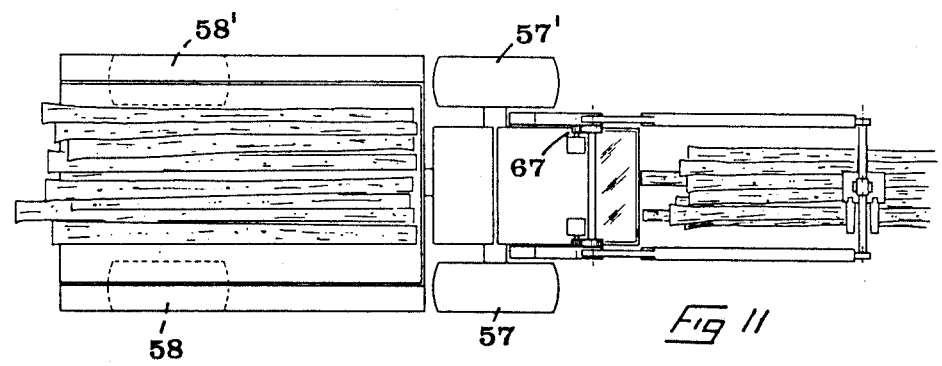

METHOD FOR MECHANIZED THINNING OF A FOREST, AND A HARVESTER AND FORWARDER FOR CARRYING OUT THE METHOD

TECHNICAL FIELD OF THE INVENTION

This invention relates to a method for mechanized thinning of a forest by means of a wheeled harvester having a processor for cutting, longitudinally feeding and limbing, especially small trees, and a likewise wheeled forwarder of the type comprising a crane, a driver's cab and a load carrier located behind the cab, the harvester being caused to advance in the forest stand concerned in routes optimally selectable with regard to the characteristics of the forest stand, between main haul roads or strip roads close to each other, and parked on suitable places along said routes for felling one or more trees on each parking place.

BACKGROUND OF THE INVENTION

In conventional thinning of young trees by means of machines travelling on strip roads, such roads are made in the forest stands and in order to ensure maximum yield from the remaining, thinned forest, the strip roads should be spaced as far as possible from each other. In practice, however, these strip roads, primarily because of the limited range of operation of the cranes carrying the felling or processing equipment, cannot be located at a distance from each other of more than about 30 m and then are in the form of substantially parallel, straight roads. In practice, available machines require a width of about 4 m, which means that the strip roads must have a minimum width of 4 m. This combination of relatively small spacings between the strip roads and their considerable width results in that the finally thinned stands will contain far too large areas without any trees, this notably reducing the total productivity of the stands. A highly contributory reason for poor total productivity also is that the strip roads—in order not to leave any unthinned spots in the forest stands—are made substantially rectilinear. In this way, the operator is often forced to fell first-quality, vigorous trees situated in the linear extent of the road while less vigorous trees are left in the immediate vicinity of the road.

SUMMARY OF THE INVENTION

The present invention aims at overcoming the above-mentioned drawbacks and providing a thinning method which in a simple and efficient way ensures extremely high productivity in the thinned forest. According to the invention, this object is achieved in that the harvester on each parking place is caused, in a substantially stationary condition, to fell a plurality of trees, more specifically in such a manner that each standing tree is cut and moved in an upright position to the area in front of the harvester where it is tilted to a horizontal position in which it is longitudinally fed, while being limbed, through the processor to a position at least partially below the harvester in the region between the wheels thereof, so as to build up a bundle of limbed tree stems in said region, and that the forwarder in a subsequent step is caused to follow the harvester in the same route of travel as this and load the stems placed underneath the harvester and left behind it, namely by moving said tree stems located in front of the forwarder past the cab of the forwarder to the load carrier located behind the cab, the forwarder, as it is moved along said route made by the harvester, collecting said tree stems in order to land them at the main haul road.

By the method according to the invention, it is possible to make the necessary strip or main haul roads at quite substantial distances from each other while the identical routes in which the two machines advance, can be selected in each sector of the forest stand with regard to the location of the vigorous trees, i.e. the routes need not be rectilinear but may be curved in an arbitrary fashion. Since the harvester and the forwarder separately fulfil the functions of processing and transportation, they can be made small and lightweight and, thus, may have a small working width. This in turn entails that the routes of travel—apart from not necessarily being rectilinear—may also be given an advantageously small width.

The invention also relates to a harvester and a forwarder, preferably for carrying out the method according to the invention. The features of these two machines appear in more detail from the accompanying claims.

BRIEF DESCRIPTION OF THE DRAWINGS

In the drawings, FIGS. 2 and 3 are side views of a harvester for carrying out the method of the invention in two different working operations, FIG. 8 is a simplified side view of a harvester according to an alternative embodiment, FIG. 9 is a perspective view showing a forwarder for carrying out the method of the invention, FIG. 10 is a side view of the same forwarder, and FIG. 11 is a top plan view of the forwarder.

DESCRIPTION OF THE PREFERRED EMBODIMENTS OF THE INVENTION

Figure 1:
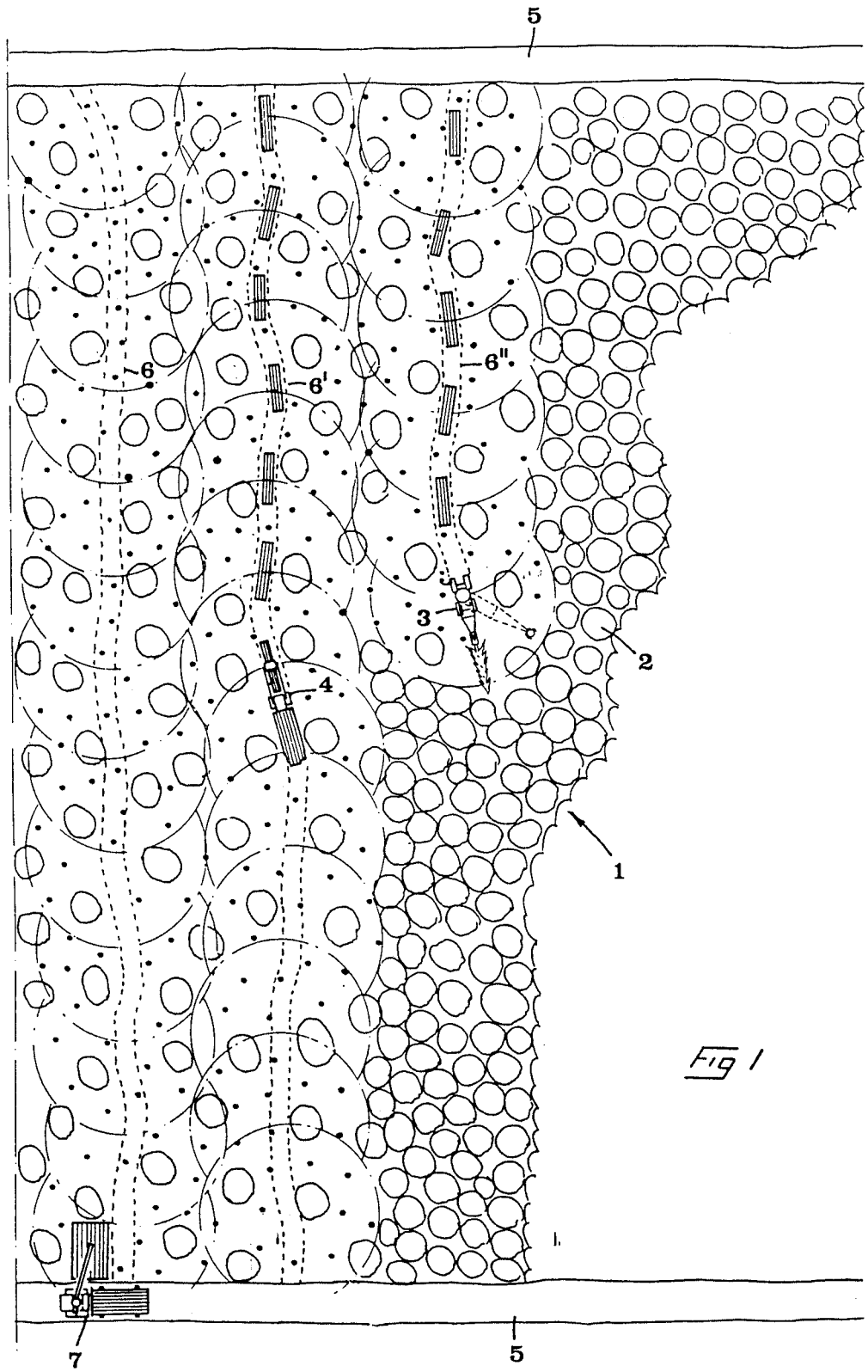
FIG. 1 is a schematic top plan view of a forest stand being thinned in accordance with the method of the invention.

In FIG. 1, 1 generally designates a forest stand with trees 2 some of which should be removed while others should be left to grow. Thinning is carried out by means of a harvester 3 and a forwarder 4. In the Figure, 5 designates two substantially parallel strip or main haul roads between which the two machines 3, 4 advance in routes 6 in a manner which will be described in more detail hereinbelow. In FIG. 1, a second forwarder 7 is shown having a greater loading capacity than the forwarder 4.

Reference is now made to FIGS. 2-8 illustrating two different embodiments of a harvester for carrying out the above-mentioned thinning operation. The harvester 3 shown in FIGS. 2-4 has a wheeled chassis 8, a driver's cab 9 mounted thereon, and a pivotable crane generally designated 10. The forwarder further has a drive unit 11, preferably in the form of an engine, a gear and hydraulic pumps. The drive unit 11 is integrated in the cab 9 so as to form a unit which is pivotally mounted on the chassis 8 by means of a gear rim 12.

Figure 4:
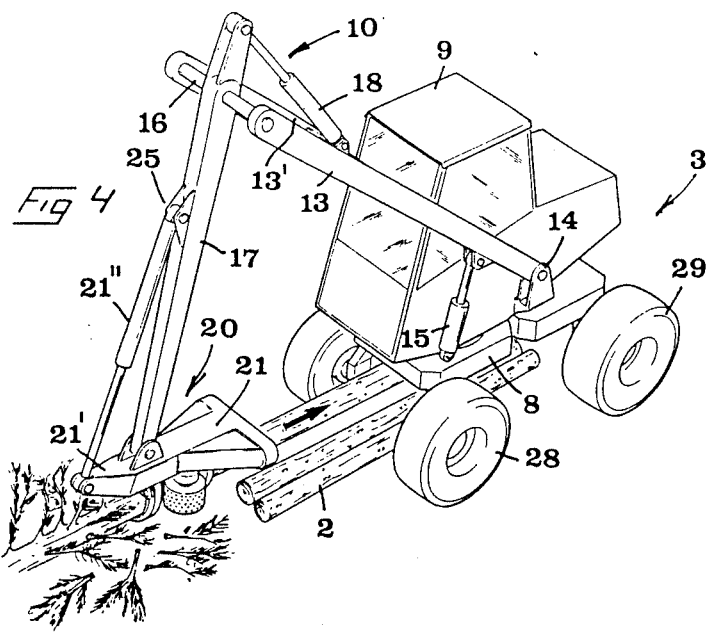
FIG. 4 is a perspective view of the same harvester.

In the embodiment according to FIGS. 2-4, the crane 10 has two main booms 13, 13' which are located on each side of the cab 9 and are mounted in pivot brackets 14 to allow pivotal movement of the booms by means of a power unit, especially double-acting hydraulic cylinders 15, 15'. The brackets 14 are suitably located at a distance of 1-1.5 m above the ground. At their free ends, the booms 13, 13' are interconnected by a cross-bar 16 about which an outer boom 17 is pivotally mounted. The boom 17 can be raised and lowered by means of a second power unit 18, suitably also in the form of a double-acting hydraulic cylinder mounted on a second cross-bar between the booms. A combined cutting and limbing unit, generally designated 20, is pivotally connected to the free end of the outer boom 17 by means of a transverse joint 19. The unit 20 comprises in a per se known manner a frame 21, a number of feed rollers 22, a number of limbing tools 23, and a cutting tool, suitably in the form of a guide bar 24. A portion 21' of the frame 21 of the unit projects a certain distance ahead of or above the joint 19 and is articulated to one end of a hydraulic cylinder or piston-cylinder mechanism 21" the opposite end of which is articulated to the outer boom 17 via a joint 25 located relatively far back on the outer boom 17. From a comparison between FIGS. 2 and 3, it is seen that the unit 20 can be pivoted between an upright position in which a tree 2 can be seized and cut, and a substantially horizontal or lying position in which the tree can be processed by being longitudinally fed through the unit, while being limbed, whereupon it is cross-cut at a suitable point of its length. The unit 20 should have a length of 1-1.5 m (equal to the height of the pivot brackets 14 above the ground).

As indicated by the dashed lines in FIG. 3, the operator can enter the cab 9 by the front, suitably in that a lower wall-forming part 26 can be swung downwards and has steps on its inner side, while an upper transparent door 27 can be swung upwards.

Since the drive unit 11 earlier mentioned extends rearwards from the brackets 14 for the crane 10 extending forwards with respect to the cab, the drive unit will advantageously act as a counterweight for the crane and its load.

Figure 6:
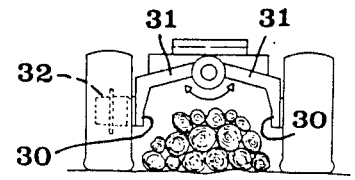
FIG. 6 is an end view illustrating the same chassis.
Figure 5:
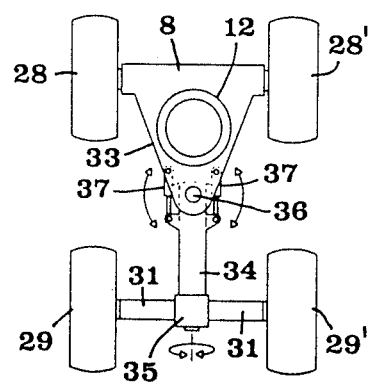
FIG. 5 is a schematic top plan view illustrating the chassis of the harvester in FIGS. 2-4.

Referring now to FIGS. 5 and 6 illustrating how the chassis 8 is supported by four wheels, namely two front wheels 28, 28' and two rear wheels 29, 29'. According to an essential feature of the invention, the chassis 8 has a ground clearance considerably greater than the radius of said wheels. Advantageously, the chassis is maintained approximately on a level with the upper portions of the wheels. As shown in FIG. 6, this has been achieved by mounting the wheels on frame or chassis parts comprising relatively narrow support members 30 extending upwardly substantially vertically from the wheel axles and merging at the top into suitably inclined transverse members 31. In this way, a bundle of tree stems stacked underneath the chassis can be given a relatively substantial height.

In practice, the above-mentioned wheels may be individually driven by hydrostatic means, as indicated at 32 in FIG. 6. The two front wheels 28, 28' are associated with a chassis part 33 supporting the cab 9 by the intermediary of the gear rim 12, while the rear wheels 29, 29' are associated with a tail part 34 extending rearwards from the chassis part 33, by the intermediary of a pendulum suspension 35 allowing the rear wheels to pivot or execute a pendulum movement sideways in relation to the tail part 34. The embodiment of the machine as exemplified in FIG. 5 is designed for articulated frame steering, namely in that the tail part 34 is connected to the chassis part 33 by means of a joint 36 and is pivotal relative to the chassis part 33 by means of hydraulic cylinders 37.

Figure 7:
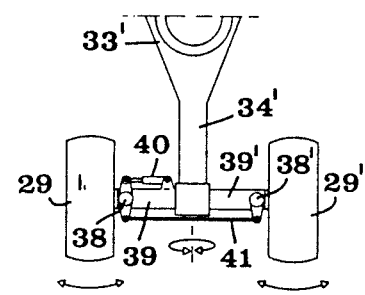
FIG. 7 is a partial top plan view illustrating an alternative embodiment of the chassis concerned.

In the embodiment shown in FIG. 7, the machine is designed with so-called double-pivot steering. In this case, the tail part 34' is rigidly connected to the front chassis part 33'. The two rear wheels 29, 29' are connected through joints 38, 38' to arms 39, 39' which in turn are mounted on the tail part 34' by a pendulum suspension in the manner earlier described. A hydraulic cylinder 40 serves to turn or pivot the wheel 29 in the direction indicated by the arrow, and a track rod 41 ensures that the other wheel 29' is always turned through the same angle as the wheel 29.

It is also conceivable to combine articulated frame steering, as shown in FIG. 5, with double-pivot steering as shown in FIG. 7.

In practice, the machine now described may advantageously have a maximum width of 2.0-2.7 m, suitably 2.2-2.4 m. The length of the vehicle, counted as the distance between the wheel axles, may be 25-50% larger than the width.

FIG. 8 shows an alternative embodiment in which the machine is equipped with a crane 10' which, in addition to an outer boom 42, has at least one main boom 44 pivotally mounted on a base part 43 and having a length substantially equal to that of the outer boom, and an auxiliary boom 45 being part of a parallelogram mechanism which includes the main boom 44, an outer boom extension 47 projecting from the joint 46 interconnecting the outer boom and the main boom, and pivoted to the auxiliary boom 45, and a link 48 pivoted both to the main boom 44 and to a sleeve or the like 49 pivoted to the auxiliary boom. The sleeve 49 is displaceable along an upright or guide 50 mounted on the base part 43, by means of a power unit, suitably in the form of a hydraulic cylinder 51. When the sleeve 49 is moved upwards or downwards on the upright 50, the auxiliary boom 45 will cause the outer boom 42 and the main boom 44 to execute equally large pivotal movements or angles of pivotment relative to a vertical plane through the joint 46. In other words, the two booms 42, 44 will always form the legs in an imaginary isosceles triangle irrespective of the pivotal position of the booms, so as to ensure a rectilinear uniform movement of the processor 20 mounted on the outer boom 42, both when the processor is moved away from the chassis or towards it.

It is evident that the crane 10' shown in FIG. 8, like the crane 10 shown in FIGS. 2-4, may comprise two main booms provided on each side of the cab and jointly carrying a single outer boom.

The base part 43 on which the main boom 44 and the upright 50 are mounted, should be tiltable in relation to the driver's cab 9, more precisely by means of a hydraulic cylinder 52. Optionally, the base part 43 may be rigidly connected to the rest of the cab unit which is tiltable in its entirety relative to the gear rim 12.

By the above-mentioned tiltability, the crane or the processor 20 mounted thereon can be raised and lowered, as indicated by the dash-dot lines in FIG. 8.

Reference is now made to FIGS. 9-11 illustrating the forwarder 4 comprising as main components a wheeled chassis 53, a driver's cab 54 and a load carrier 56 served by a crane 55. The chassis 53 is supported by two front wheels 57, 57' and two rear wheels 58, 58'.

The crane 55 comprises two spaced-apart, suitably parallel arms 59, 59' which are pivotal about an axis 60 located in the area of the cab 54. More specifically, the crane arms are mounted on a frame comprising two uprights 61 which are mounted on the chassis and have at their top portions forwardly projecting brackets 62 locating the pivot axis 60 on a level above the cab roof 54'. The two crane arms 59, 59' are interconnected at their free ends by a cross-bar 63 carrying a grapple 64 serving to seize one or more tree stems lying in front of the forwarder. Since the arms 59, 59' are disposed on each side of the cab 54, the distance between them becomes relatively large, so that the grapple 64 can seize a bundle of trees of a considerable size, which thus can be swung into the space between the arms. In a preferred embodiment of the crane construction illustrated, the arms may comprise telescopically displaceable extension members 65, 65' on which the cross-bar with the associated grapple is fixed. For example, these extension members can be extended from the arms 59 by means of double-acting hydraulic cylinders 66.

The pivotal movement of the crane arms can be achieved by any suitable means, for instance gear mechanisms as indicated at 67. As appears from FIG. 10, the arms are pivotal through an angle of more than 180° between a position in which the arms have been swung forwards-downwards with respect to the axis 60 and in which the grapple may seize about a bundle of trees on the ground, and a substantially horizontal position in which the arms have been swung rearwards with respect to the axis 60 and in which the bundle of trees can be dropped onto the load carrier 56. In a manner characteristic of the invention, the bundle of trees is moved during said pivotal movement in between the arms 59, 59', i.e. without deviating from a path of movement which is constantly within the lateral extent of the forwarder.

The load carrier 56 consists of a rearwardly and upwardly open trough having two longitudinal side walls 68, 68', a bottom 69, and a front wall grating 70. At the rear end, the loading trough is articulated to the chassis 53 by means of a joint 71 and is tiltable in relation to the chassis by means of a tipping cylinder 72. As appears from FIG. 9, the two longitudinal side walls 68, 68' are convexly outwardly curved or bent in cross-section. As opposed to completely straight walls, these walls are more gentle on surrounding trees when the load carrier heels because of uneven ground. Since the loading trough is tiltable in the manner described above, extremely fast unloading of the tree stems is obtained, as opposed to conventional forwarders equipped with fixed bunks from which the timber must be unloaded by means of grapples.

Optionally, the loading trough 56 may be provided with suitable means for bundling the timber by means of clamps or the like.

The wheels supporting the chassis of the machine are advantageously individually driven by hydrostatic means. In the drawing, the front wheels 57, 57' are fixedly mounted on the front part of the chassis. Optionally, the single front wheels may be replaced by two per se known bogies pivotally suspended in the chassis, for obtaining gentle travel. The rear wheels 58, 58' are mounted in the chassis by a pendulum suspension and are pivotal relative to the pendulum suspension arms for obtaining so-called double-pivot steering. It should here be noted that the downwardly tapering shape of the loading trough 56 provides ample space for the wheels 58, 58' so as to be able to pivot relative to the chassis as well as execute a pendulum movement, i.e. be individually raised and lowered in relation to the loading trough without necessitating an increase of the lateral distance between the two wheels 58, 58' as compared with the corresponding distance between the front wheels 57, 57'. Thus, the forwarder may also be given a relatively small width, suitably the same width as the harvester previously described, i.e. 2.0-2.7 m or suitably 2.2-2.4 m.

Although the ground clearance of the forwarder now described is not critical in the same way as in the harvester previously described, it is nevertheless preferred, also in the forwarder, to have a substantial ground clearance to make it possible to drive the forwarder along a route on which tree bundles have been placed. In this manner, the forwarder can leave the route should the load carrier be fully loaded with timber at any point along the route.

THE THINNING OPERATION

In the forest stand shown in FIG. 1, the harvester 3 advances first, more precisely in routes designated 6, 6', 6''. Along each of these routes, the harvester 3 is parked on suitable parking places, and on each parking place the harvester fells one or more trees in the area in front and in the extension of the machine in order to continue the route commenced. Referring to FIGS. 2-4, this is carried out in such a manner that the crane 10 is pivoted outwards such that the processor 20 can seize the stem of a tree and cut it at the base by means of the cutting tool 24. The processor is thereafter swung from the upright position to the horizontal position shown in FIG. 3, in which the tree is fed longitudinally through the processor by means of the feed rollers 22 while the tree is limbed by means of the limbing tools 23. After a suitable length of the tree has been limbed (usually 3-5 m), the tree is cross-cut by the cutting tool 24. The processed part of the tree, as shown in FIGS. 3 and 4, will thus be located underneath the harvester in the space defined by the chassis 8 and the wheels 28, 28' and 29, 29'. By moving the crane 10 back in a standard manner to one and the same position in relation to the machine in connection with the processing, it is ensured that the bundle placed underneath the harvester always becomes levelled at its top end in connection with the cross-cutting of the processed timber. Further, in the harvester according to the invention the limbs removed from the tree stem will be located in the region in front of the machine so as to form a brush mat which both increases the carrying capacity of the ground and forms a protective layer for the roots of trees not felled, when the machine is further advanced along the route. After one or more trees have been removed from the forest stand in the planned route straight ahead of the machine, the cab together with the associated crane is swung into the stand at the side of the route in order to fell and process additional trees to be removed. This is achieved in that the crane is extended in order to grip a tree which, after being cut, is moved inwards towards the machine in an upright position, whereupon the cab and the crane are pivoted back to the starting position in alignment with the chassis and the route of travel. The tree is then lowered to the position shown in FIG. 3 and processed. This procedure is thereafter repeated until all trees to be thinned out have been removed from the area surrounding the parking place of the machine. In practice, the crane 10 may have an operating range of 6-8 m and so, a substantially circular area of a diameter of 12-16 m will be thinned at each parking place.

When thinning has been completed on one parking place, the machine is advanced to the next parking place where it fells the trees located in the planned route. The machine need not be advanced rectilinearly but may deviate quite considerably from a straight line to thin out less vigorous trees while leaving more vigorous trees so as to obtain optimum thinning. The essential point merely is that the machine should not be allowed to deviate to such an extent from a previously made, thinned route that unthinned spots remain in the stand. The operator may therefore advantageously run the machine with a certain overlap between adjacent routes, as indicated by dash-dot circles in FIG. 1.

As the harvester is working its way through the forest stand, it leaves tree bundles along the route, as shown in FIG. 1. This is of course made possible by the substantial ground clearance of the machine. The harvester may advantageously operate in a zigzag fashion between the main haul roads 5, as suggested in FIG. 1, which means that the harvester, after making the route 6 running from the top to the bottom of the drawing, proceeds along the next route 6' running from the bottom to the top of the drawing, and thereafter continues along the route 6" running from the top towards the bottom of the drawing, and so forth.

For collecting the tree bundles which the harvester has left behind, the forwarder 4 is used. As appears from FIG. 10, the crane of the forwarder uses the grapple 64 for collecting a tree bundle located in front of the forwarder, whereupon the bundle is moved over the cab and dropped onto the load carrier 56. This is carried out without any risk whatever that the tree bundle or the crane comes in contact with the trees standing immediately adjacent the route. As the forwarder advances along a route, the loading trough 56 is filled more or less depending on the amount of trees thinned out. When the forwarder has collected all the timber along a route, the timber is landed in a stack in the immediate vicinity of the main haul road 5 where the forwarder emerges. This stack may be collected by a larger forwarder 7 or, optionally, any other suitable vehicle.

ADVANTAGES OF THE INVENTION

Essential advantages of the thinning method of the invention using the above-described harvester in combination with the forwarder are that very large distances may exist between the strip or main haul roads, and that the machines may select suitable, irregular routes while achieving a biologically optimal thinning of the forest stand. Such thinning can be carried out in a manner most gentle on the remaining trees, since the timber can be placed in bundles between the wheels of the harvester and since both machines can operate without causing any damage to the remaining trees. Also, the harvester can always place a brush mat in front of it in the planned route of travel.

I claim:

1. A method for mechanically thinning a forest comprising the steps of: (a) advancing a wheeled harvester provided with means for cutting, longitudinally feeding and delimbing trees through a selected cleared route between main haul or strip roads, said route being only slightly wider than the width of said wheeled harvester; (b) stopping said harvester at different locations along said route; (c) felling one or more trees at said location by means of said wheeled harvester, said trees being felled by cutting a standing tree, moving said felled tree into an upright position in an area in front of said wheeled harvester, tilting said felled tree into a horizontal position, longitudinally feeding said tree into said means for delimbing, thereby providing a delimbed tree, and storing said tree at least partially beneath said wheeled harvester and between its wheels, whereby when a plurality of trees is cut at a given location, a pile of delimbed trees is built-up beneath said wheeled harvester; (d) advancing said wheeled harvester to another location along said route, and repeating said felling step (c); (e) following said wheeled harvester by a wheeled forwarder having a crane, a driver's cab and a load carrier behind said cab for loading and transporting delimbed trees along substantially the same route of travel as said harvester; and (f) loading said pile of delimbed trees disposed along said route onto the carrier of said forwarder by movement, by means of said crane, of said pile of delimbed trees along the longitudinal path of said selected route.

2. The method as claimed in claim 1 wherein said pile of delimbed trees are transferred to the carrier of said forwarder by lifting and moving said pile of delimbed trees over and rearwardly past said cab.

3. In a harvester for mechanized thinning of young trees having a wheeled chassis including supporting wheels, a driver's cab mounted on said chassis, a crane having an outer boom having a free end and an attached end attached to said harvester, the free end of said boom being provided with tree processor means, said tree processor means including means for holding at least one tree, at least one cutting tool and a tree branch limbing tool for cutting limbs, said cab and said crane being jointly rotatable to different angular positions relative to said chassis, said boom being movable between inner and outer end positions in which said tree processor is spaced from said attached end, and an inner end position with said processor adjacent the cab, means for longitudinally feeding a tree stem through said processor, a frame and a transverse drive means, said frame being connected by said transverse drive means to said free end of said outer boom whereby the processor frame is pivotable to the same vertical plane as said outer boom to permit a felled tree to be held by said processor, moved in a substantially upright position in front of the harvester chassis, tilted to a horizontal position, fed by said feeding means longitudinally through said processor and cross-cut when a major part of the tree stem has been placed underneath said chassis, the improvement wherein said wheeled harvester has a ground clearance at least equal to the radius of the supporting wheels for storing delimbed trees underneath said chassis, and wherein said supporting wheels comprise two pairs of hydrostatically driven wheels, a front pair of said wheels being associated with a portion of the chassis supporting the cab, and a rear pair of said wheels being mounted by means of a pendulum suspension relative to a rear portion of said chassis and extending rearwardly from said cab-supporting chassis portion.

4. A harvester as claimed in claim 3, wherein each rear wheel is articulated to an arm projecting from a pendulum suspension of the tail part and pivotable relative to said arm by means of a hydraulic cylinder or the like for steering said rear wheels at a desired angle relative to the front wheels.

* * * * *